United States Patent [19]

Hutt

[11] 4,249,629
[45] Feb. 10, 1981

[54] ARTICULATED VEHICLE

[76] Inventor: Arthur R. Hutt, 707 Pluma Dr., Bellevue, Nebr. 68005

[21] Appl. No.: 8,668

[22] Filed: Feb. 2, 1979

[51] Int. Cl.³ .............................................. B62D 5/06
[52] U.S. Cl. .................................. 180/134; 280/400; 280/403; 280/420
[58] Field of Search ................... 180/14 R, 14 A, 134, 180/135, 136, 137, 138, 139, 235, 242, 266; 280/403, 420, 421, 422, 400, 492

[56] References Cited

U.S. PATENT DOCUMENTS

| 2,400,868 | 5/1946 | Tourneau | 180/79.1 |
|---|---|---|---|
| 2,680,491 | 6/1954 | Davidson | 180/138 |
| 2,683,496 | 7/1954 | Prost | 180/266 |
| 3,699,676 | 10/1972 | Beck | 180/136 |
| 4,089,384 | 1/1977 | Ehrenberg | 180/242 |

Primary Examiner—John J. Love
Assistant Examiner—Randall A. Schrecengost
Attorney, Agent, or Firm—Henderson & Sturm

[57] ABSTRACT

An articulated vehicle having front and rear wheeled sections coupled together for relative movement of the sections about fore-and-aft and upright axes, the coupling including a member of inverted L-shaped having rigidly united horizontal and upright legs in which the horizontal leg provides the fore-and-aft axis and the upright leg provides the upright axis, featuring further such member of hollow configuration to accommodate cables and the like. The construction lends itself to military vehicles of large size in which the hollow coupling can accommodate movement of crew members between the front and rear sections.

14 Claims, 5 Drawing Figures

ARTICULATED VEHICLE

SUMMARY OF THE INVENTION

The invention relates to an articulated vehicle and more particularly to such vehicle that possesses considerable versatility and one that lends itself to application to military vehicles adapted to traverse varying terrain and may be made to float.

As is known to those versed in the art, the typical articulated vehicle includes front and rear wheeled sections hinged together for relative movement about both horizontal (or fore-and-aft) and vertical axes so that all four wheels contact the ground irrespective of variations in ground contour. Also, the typical vehicle of such type will be steered about the vertical axis by some for of power-exerting means, commonly a lever arm on the vertical axis and a hydraulic cylinder or the like acting selectively on the lever to achieve steering in opposite directions. A basic problem with this type of steering is that the operating parts are exposed to the weather and to the conditions encountered during travel of the vehicle; e.g., dirt, water etc. It is therefore a feature of the present invention to provide a power steering means completely contained within one of the sections, preferably an electrically powered worm and gear device.

The invention contemplates a vehicle of unusual size, one in which the crew is housed within the sections-or at least within one section. It is therefore an object to provide a coupling between the sections that is tubular or hollow so as to accommodate power cables and other vital conduits, etc., and may be used to enable passage of crew members between the sections. In a preferred embodiment, the coupling is of L-shape, having a horizontal leg journalled to one section on the horizontal axis of articulation and a vertical leg journalled to the other section on the vertical axis of articulation. The wheels are independently driven selectively in forward or reverse and the steering is achieved by electrical means including a motor. Separate electric motors are provided for the wheel drives and at least one of the secions carries within it a power plant capable of developing the necessary electrical energy. Because of the contemplated use of the vehicle for military purposes, all joints are constructed so as to be water and dirt proof.

The wheels themselves are of special construction, being resilient instead of resiliently sprung. Exemplary dimensional characteristics of the vehicle may be as follows: length, 64'; height, 24'; width, 24', with wheels of 20' diameter. The steering is preferably achieved by a series-reversible electric motor. Each wheel motor may be capable of developing 1,000 H.P. These are series-parallel motors having the capacity to drive the vehicle in either direction in the range of 20-25 M.P.H. Braking is by means of reversing power to the wheel motors.

DESCRIPTION OF THE PREFERRED EMBODIMENT

Figure 1:
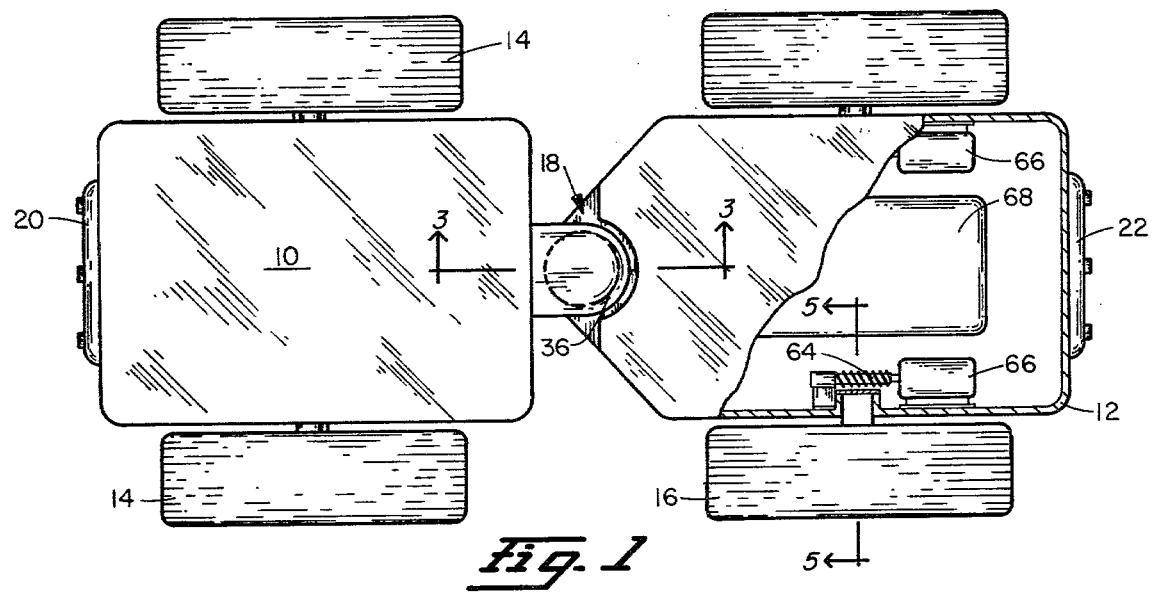
FIG. 1 is a plan of a preferred embodiment of the vehicle, with portions of the rear section broken away.
Figure 2:
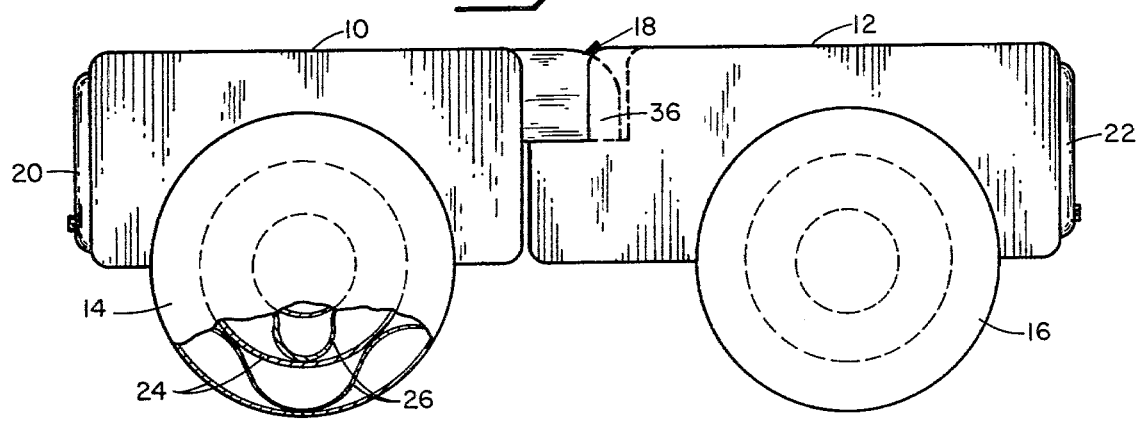
FIG. 2 is a side elevation, with portions broken away.

The vehicle comprises front and rear sections 10 and 12, respectively. The front section is carried on a pair of drive wheels 14 and the rear section on a similar pair of drive wheels 16. The two sections are hingedly interconnected at their proximate ends by coupling means designated in its entirety at 18. The coupling connects the sections for relative movement about a vertical axis A—A and about a horizontal axis B—B (FIGS. 1 and 2). Each section is in the form of a housing or compartment and could be constructed of armor-resistant steel or the like. Access to and exit from the front compartment is by a removable hatch 20, and a similar hatch 22 is provided at the rear. Suitable latch means (not shown) may be provided for interior locking of the hatches. These may be armor-proof glass to provide views of the outside.

Figure 5:
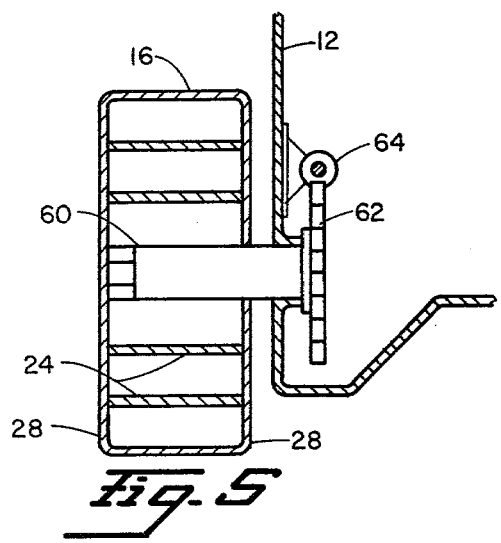
FIG. 5 is an enlarged section on the line 5—5 on FIG. 1.

Each wheel is of special construction, at least in the present environment. Since all wheels are the same, it is deemed that description of one will suffice for all. As best seen in FIGS. 2 and 5, the wheel is made up of a plurality of concentric steel rings 24, between are undulated steel springs 26 all suitably secured together. The rings possess sufficient resiliency to yield to variations in ground contour and, being backed up by the springs 26, quickly recover their normal shaped after deflection. This enables the vehicle to achieve sufficient "springing" without resort to complicated axle-to-frame suspensions. As best seen in FIG. 5, each wheel is enclosed at both its inner and outer sides by a flexible, waterproof material of any suitable type, as at 28, to prevent the entrance of dirt, water, sand etc.

Figure 3:
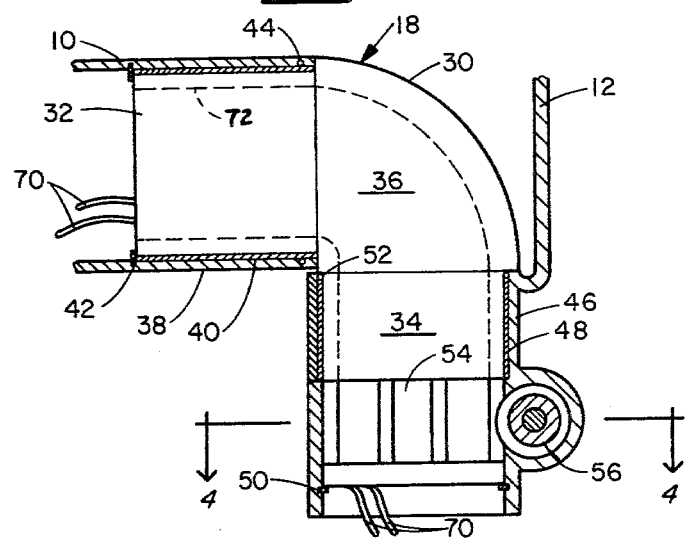
FIG. 3 is an enlarged section on the line 3—3 of FIG. 1.
Figure 4:
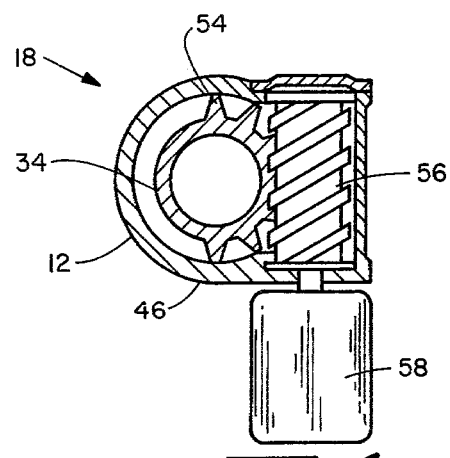
FIG. 4 is a section on the line 4—4 of FIG. 3.

FIGS. 3 and 4 show the details of the coupling means 18, here comprising a member 30 of L-shape, preferably inverted L-shape, having a horizontal leg 32 and a vertical leg 34 integrally joined together by an elbow 36. Bearing means 38, including a bushing 40 and snap ring 42, journal the leg 32 to the front section 10. An O-ring 44 is shown as representative of a dirt and water-tight seal. The bearing sleeve of the bearing means 38 may be cast integrally with or welded or otherwise affixed to the front section 10. The rear section 12 includes as part thereof, or as a rigid attachment thereto, second bearing means 46 in which are disposed a suitable bushing 48, snap ring 50 and sealing means 52, thus affording a journal of the coupling means 18 to the rear section on the vertical axis A—A.

The lower part of the depending leg 34 is formed as, or has affixed thereto, a force receiving means, here a gear element 54 which receives force from a force applying means, here a gear element or worm 56. This worm is affixed to the driving shaft of a power source, represented here by a series-reversible electric motor 58 (FIG. 4). As will be seen, driving of the motor in selected opposite directions turns the gear 54 and this transmits force via the vertical leg 34 of the coupling means 18 to steer the sections relatively about the vertical axis A—A. Each section can, in a preferred embodiment, turn through 22½° or a total of 45° allowing an 84' turning radius.

FIG. 5 is representative of the drives for all four wheels; hence, reference will be made to this figure without repetition of the description for the other drives. As seen, the wheel 16 (14) is carried on a live axle 60 which is suitably journalled in the associated sidewall of the section 12 (10) and which has keyed or splined to its inner end a gear element 62 in mesh with a worm gear element 64 that is driven by a series-parallel electric motor 66 (FIG. 1). As noted above, these motors may be selectively activated to drive all motors at once in one direction for, say, straight-ahead travel, for example. The motors may be separately operated for braking, steering assist etc. A diesel-electric power plant 68 is carried in the rear section 12 to furnish the electrical energy for all five motors, as well as for other components (not shown). Any suitable control system, not significant per se, may be employed.

As observed above, the coupling means 18 is hollow or tubular to provide a passage or communication 72 between the sections so as to accomodate cables, conduits, etc. as at 70 (FIG. 3) and even to allow crew members to move back and forth between the sections when the invention is applied to large scale vehicles.

Other objects, features and advantages will occur to those skilled in the art, as will various modifications and alterations within the scope of the invention.

I claim:

1. An articulated vehicle including front and rear wheeled sections; coupling means intermediate the sections and connecting them together for relative movement about both fore-and-aft and vertical axes, characterized in that the coupling means is an integral hollow L-shaped member, to provide unobstructed communication between the sections, with its hollow horizontal leg journalled to one section on the fore-and-aft axis and its hollow vertical leg journalled to the other section on the vertical axis; force receiving means on the vertical leg; and force applying means in the associated section for steering the vehicle.

2. An articulated vehicle including front and rear wheeled sections; coupling means intermediate the sections and connecting them together for relative movement about both fore-and-aft and vertical axes, characterized in that the coupling means is an integral hollow L-shaped member, to provide unobstructed communication between the sections, with its hollow horizontal leg journalled to one section on the fore-and-aft axes and its hollow vertical leg journalled to the other section on the vertical axis.

3. The articulated vehicle of claim 2, further characterized in that the upright leg has force receiving means thereon and means is provided in the associated section for applying force to said means for steering the vehicle.

4. The articulated vehicle of claim 3 or 3 in which the force receiving means includes a hollow gear element co-axially fixed to said upright leg.

5. The articulated vehicle of claim 4 in which force applying means includes a gear element meshing with the first named gear element.

6. The articulated vehicle of claim 5 in which the second named element is a worm.

7. The articulated vehicle of claim 5 in which the force applying means includes a reversible electric motor and electrical power means is carried by the associated section.

8. The articulated vehicle of claim 2 or 1 further characterized in that the wheels of the front section are driven independently of each other and the wheels of the rear section are driven independently of each other and independently of the front section wheels.

9. The articulated vehicle of claim 8 further characterized in that the upright leg of the member has force receiving means thereon, means is provided in the associated section for applying force to said means for steering the sections and electrical power means is provided for controlling the force applying means and for selectively driving the wheels.

10. The articulated vehicle of claim 2 or 1 further characterized in that the horizontal leg of the coupling member is enclosed in the associated section and the upright leg is enclosed in the other section.

11. The articulated vehicle of claim 2 or 1 further characterized in that the upright leg has rigidly affixed thereto a force receiving means enclosed within the associated section and said section encloses and carries force applying means acting on the force receiving means for steering the sections relative to each other.

12. The articulated vehicle of claims 2 or 1 wherein the unobstructed communication between the sections permits the passage of objects between the said sections.

13. The articulated vehicle of claim 12 wherein the objects are inanimate.

14. The articulated vehicle of claim 12 wherein the objects are animate.

* * * * *